Aug. 11, 1970        A. J. W. ROZELAAR ET AL        3,523,448
MEASUREMENT OF SURFACE CHARACTERISTICS
Filed Dec. 14, 1967

INVENTORS
A. J. W. Rozelaar
U. Imre
J. Brunton
BY
Cushman Darby & Cushman
ATTORNEYS

United States Patent Office 3,523,448
Patented Aug. 11, 1970

3,523,448
MEASUREMENT OF SURFACE CHARACTERISTICS
Alan Jack Westell Rozelaar, Solihull, and John Brunton, Moseley, Birmingham, England, and Umit Imre, Samsun, Turkey, assignors to National Research Development Corporation, London, England
Filed Dec. 14, 1967, Ser. No. 690,559
Int. Cl. G01n 13/00; G01r 31/02
U.S. Cl. 73—104
14 Claims

ABSTRACT OF THE DISCLOSURE

A method of testing the surface characteristics of a body comprises placing the body in contact with a member of known surface properties and measuring the force required to separate the body from the member when at least one is electrostatically charged. With electrically conductive bodies charging can be effected by connecting the body and the member in an electrical circuit such that there will be a potential difference between the body and the member when these are not in contact.

---

This invention relates to the measurement of surface characteristics of bodies, and is particularly applicable to the measurement of the surface roughness of such bodies. The objects of the invention are to provide a convenient method of and convenient apparatus, for measuring such characteristics.

In accordance with the broadest aspect of the invention a method of measuring a surface characteristic of a body comprises measuring the force required to separate the body from contact with a member of known surface characteristics when a predetermined electrostatic charge is present on said body and/or said member such as to cause said member and said body to be electrostatically attracted towards one another. More particularly the method is useful for testing electrically conductive bodies and comprises placing the electrically conductive body in contact with an electrically conductive member of known surface characteristics with said body and said member connected in an electrical circuit such that there is potential difference between the body and the member when these are separated, and measuring the force required to overcome the electrostatic attraction between the body and the member.

Apparatus in accordance with the invention comprises a member of known surface characteristics supported for contact with the body to be tested, means for applying to said member or to said body a force to separate it from the body or the member as the case may be, and means for applying to said member and/or said body a predetermined electrostatic charge to establish an attractive force acting between said member and said body and means whereby a measure of the force required to separate the body from contact with the member can be obtained. More particularly apparatus as above defined for testing an electrically conductive body comprises an electrically conductive member of known surface characteristics supported for contact with the body to be tested, means for appyling to said member or to said body a force to separate it from the body or the member as the case may be, electrical connections whereby a potential difference may be established between said member and said body when said body and said member are separate and means whereby a measure of the force required to separate the body from contact with the member can be obtained.

Figure 1:
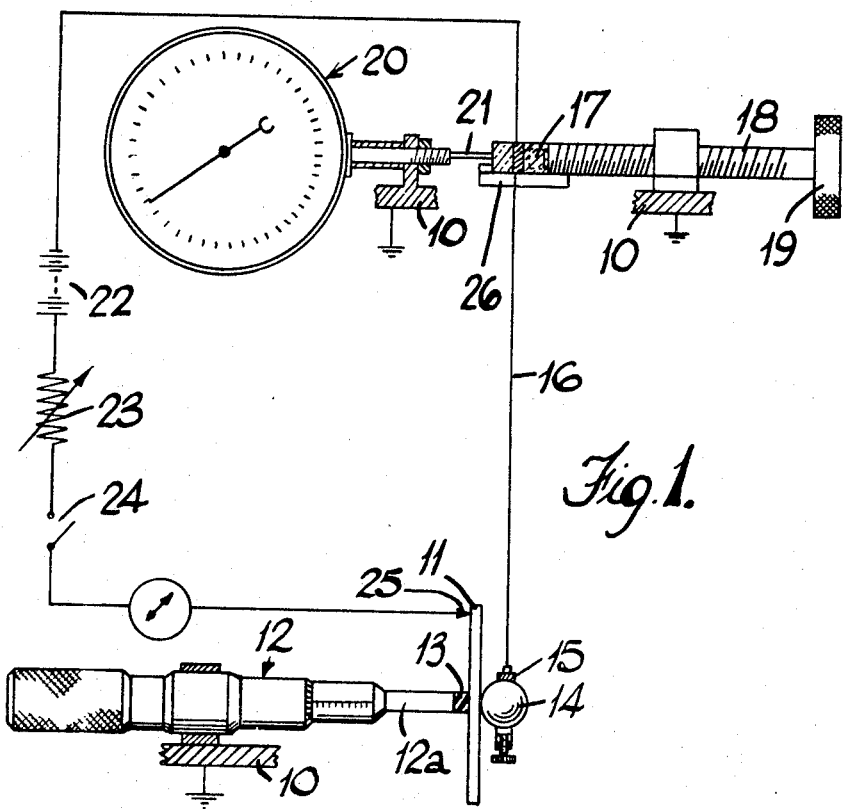
Figure 2:
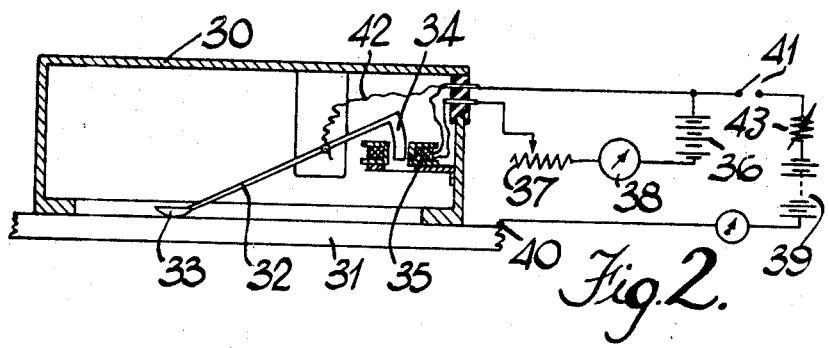

Reference is now made to the accompanying drawings in which FIGS. 1 and 2 are diagrammatic illustrations of two examples of apparatus in accordance with the invention.

Referring firstly to FIG. 1, there is provided a supporting structure 10 (parts of which only are shown) which may be in the form of a casing or a frame. An arrangement is made whereby a test body 11 is adjustably mounted. This arrangement is not shown in detail in the drawings, but a micrometer screw gauge 12 for adjusting the position of the test body 11 is shown. An electrical insulating member 13 is interposed between the stem 12a of the gauge 12 and the test body 11.

The apparatus includes a member 14 of known surface characteristics. This member is in the form of a ball, formed for example, of Stellite. The ball 14 is carried by a clamp 15 on the end of a wire 16 suspended from an insulating support 17. The support is displaceable in a horizontal direction on slides 26 by means of an adjusting screw 18 with a knob 19. For measuring the displacement of the support 17 there is a dial gauge 20, the feeler 21 of which is engaged against the support 17.

The wire 16 is connected through a conductor extending through the support 17 to one terminal of a battery 22. The other terminal of this battery is connected via a resistor 23 and a switch 24 to a contact 25 for engagement with the test body 11.

In use, the apparatus is set up for making a measurement by opening the switch 24, adjusting the screw 18 until the gauge 20 registers zero, and then adjusting the micrometer 12 until the test piece 11 is just in contact with the ball 14. The switch 24 is then closed and the screw 18 is turned to displace the support 17 to the right as viewed in FIG. 1. This causes a force having a horizontal component to be applied to the ball 14, tending to separate it from the test body 11. It will be appreciated, however, that separation of the ball 14 from the test body 11 would cause these to be at a different potential so that the ball 14 would be electrostatically attracted to the test body 11. The support 17 is displaced to the right as seen in FIG. 1 until the horizontal component of the force applied to the ball 14 by the wire 16 is sufficient to overcome the electrostatic attraction. The ball 14 will then be observed to separate from the body 11. The displacement of the support 17 as registered by the gauge 17 provides a measure of the force required to separate the ball 14 from the test body 11.

Theoretically the force required to separate the ball 14 from the body 11 depends upon:

(a) the surface characteristics of the ball 14,
(b) the surface characteristics of the body 11, and
(c) the voltage applied by the battery 22.

The surface characteristics are of importance since, with a rough surface, the effective position of the surface as far as the electrostatic force is concerned is different from the effective position of the surface so far as contact is concerned. Thus, assuming the ball 14 to have a perfectly smooth surface, the electrostatic attraction will decrease with increasing surface roughness of the test body 11.

The force which is applied to the ball 14 can be calculated in terms of the necessary displacement of the support 17 to cause separation of the ball 14 from the test body 11, the total weight of the assembly of the ball 14, the clamp 15 and the wire 16, and the position of the centre of gravity of this assembly. The calculated force for a given potential difference is in itself a characteristic of the surface tested. For any given type of surface this force may be correlated with the surface finish of the surface. The force, is however, also believed to be dependent upon the shape of the irregularities in the surface of the test body and to the presence and thickness of any oxide or other film on the surface.

The following table contains a list of results obtained from an experiment using apparatus as described above. A Stellite ball of five-sixteenths inch diameter was employed and a voltage of 12 volts was applied.

| Surface finish micro inches: | Force grams |
|---|---|
| 2 | .003445 |
| 5 | .002114 |
| 10 | .001592 |
| 12.5 | .001566 |
| 15 | .001017 |
| 20 | .000994 |
| 30 | .000615 |
| 40 | .000464 |

Another example of the invention is shown in FIG. 2. In this case the apparatus includes a test head 30 adapted to be placed on the test body 31. Pivotally mounted inside the head 30 is a light electrically conducting rod 32. This rod is supported on a low friction bearing, such as a torsional thread made of quartz, Phosphor-bronze or the like. On one end of the rod 32 is a light cup-shaped member 33 which may be formed of smooth metal foil or the like. The other end of the rod 32 is provided with a ferro-magnetic vane 34 which co-operates with a coil 35 to form a moving iron movement. It will be appreciated that the passage of current through the coil 35 will cause the vane 34 to be drawn into the coil thereby turning the rod 32 about its pivotal support.

The control circuit for the apparatus shown in FIG. 2 includes a battery 36 which is connected in a series circuit with the coil 35, a variable resistor 37 and a meter 38 for measuring the current flowing through the coil 35. A second battery 39 has one terminal connected to a contact 40 for engagement with the test body 31 and its other terminal connected via a resistor 43 and a switch 41 to the rod 32. The connection to the rod 32 may, as shown, be made by a pigtail 42.

In use the rod 32 is viewed through a window in the head 30 and, with the switch 41 open the resistor 37 is set to cause the member 33 to be brought into light contact with the body 31. The switch 41 is then closed so that, as in the example of the invention shown in FIG. 1, there is an electrostatic attraction between the body 31 and the member 33. The resistor 37 is then adjusted until the member 33 is separated from the body 31.

Once again the force required to separate the member 33 from the body 31 can be calculated from the readings of the meter 38.

Having thus described our invention what we claim as new and desire to secure by Letters Patent is:

1. A method of measuring a surface characteristic of an electrically conductive body comprising placing the body in contact with an electrically conductive member of known surface characteristics with said body and said member connected in an electrical circuit such that there is a potential difference between the body and the member when these are separated, and measuring the force required to overcome the electrostatic attraction between the body and the member.

2. A method as claimed in claim 1 comprising displacing a support mechanically connected to said member to apply a steadily increasing force to said member to cause separation thereof from said body.

3. Apparatus for measuring a surface characteristic of an electrically conductive body comprising an electrically conductive member of known surface characteristics supported for contact with the body to be tested, means for applying to said member or to said body a force to separate it from the body or the member as the case may be, means connected to the member and adapted to be connected to the body for establishing therebetween a potential difference when said body and said member are separate and means whereby a measure of the forces required to separate the body from contact with the member can be obtained.

4. Apparatus as claimed in claim 3 in which said electrically conductive member has a convex surface engageable with the body to be tested.

5. Apparatus as claimed in claim 4 in which said convex surface is spherical.

6. Apparatus as claimed in claim 5 in which said member is a ball.

7. Apparatus as claimed in claim 6 in which said force applying means comprises a support, mechanical means coupling said support to said ball and means for displacing said support relative to the ball whereby said coupling means applies said force to the ball.

8. Apparatus as claimed in claim 7 in which said coupling means comprises a wire carrying the ball at one end and suspended at its other end from said support, said support being movable in a horizontal direction.

9. Apparatus as claimed in claim 8 in which the support is connected to an adjustment screw, and in which there is provided a gauge for measuring the displacement of the support.

10. Apparatus as claimed in claim 9 incorporating adjustable means for supporting said body, whereby the position of said body can be adjusted so that it is in contact with the ball when no potential difference is applied whilst the gauge registers a zero reading.

11. Apparatus as claimed in claim 5 in which said member is a light cup formed of metal foil.

12. Apparatus as claimed in claim 11 in which said member is supported on a rod movable out of engagement with said body by electromagnetic means.

13. Apparatus as claimed in claim 12 in which said electromagnetic means includes a ferro-magnetic element connected to said member and a coil into which said element is drawn on the passage of current through the coil, the current providing a measure of the force applied to said member.

14. Apparatus as claimed in claim 13 in which said member is carried at one end of a pivoted rod and said element is carried at the opposite end thereof.

References Cited

UNITED STATES PATENTS

| 3,009,100 | 11/1961 | Muchnick | 324—54 |
| 3,250,988 | 5/1966 | McGrath | 324—28 |
| 3,308,376 | 3/1967 | Katz | 324—61 |

RICHARD C. QUEISSER, Primary Examiner

E. J. KOCH, Assistant Examiner

U.S. Cl. X.R.

324—28